United States Patent

Protas

[15] 3,697,676

[45] Oct. 10, 1972

[54] HEAD-TO-TAPE ALIGNMENT APPARATUS AND METHOD

[72] Inventor: Arthur I. Protas, Brooklyn, N.Y.

[73] Assignee: Cartridge Television, Inc., New York, N.Y.

[22] Filed: June 8, 1971

[21] Appl. No.: 151,148

Related U.S. Application Data

[63] Continuation of Ser. No. 789,110, Jan. 2, 1969, abandoned.

[52] U.S. Cl.......................178/6.6 P, 179/100.2 CA

[51] Int. Cl......G11b 15/60, G11b 17/00, H04n 5/78

[58] Field of Search... 178/6.6 A; 179/100.2 T, 100.2 MD, 179/100.2 CA

[56] References Cited

UNITED STATES PATENTS 3,123,272 3/1964 Pollaschek..........179/100.2 T 3,229,045 1/1966 Bakos et al..........179/100.2 R

*Primary Examiner*—James W. Moffitt
*Assistant Examiner*—Steven B. Pokotllow
*Attorney*—Charles M. Hogan

[57] ABSTRACT

Apparatus for bringing a number of oblique signal record tracks on a moving magnetic tape into registry with a number of recording heads of a rotating head tape transport system. In one embodiment, a pair of shiftable tape guides are used to shift the tape relative to and generally axially of the circular paths of the rotating heads. In another embodiment, a means is provided for shifting the heads axially of their circular paths and relative to the tape guides. In either case, the circular paths of the heads are brought into coincidence with the tape record tracks. To render such circular paths and the record tracks parallel, one of the tape guides can be shifted relative to the other tape guide or the mounting means for the heads can be tilted with respect to the tape.

3 Claims, 5 Drawing Figures

INVENTOR.
ARTHUR I. PROTAS
BY Townsend and Townsend
ATTORNEYS

INVENTOR.
ARTHUR I. PROTAS
BY Townsend & Townsend
ATTORNEYS

HEAD-TO-TAPE ALIGNMENT APPARATUS AND METHOD

This application is a continuation of U.S. patent application, Ser. No. 789,110 entitled "Heat-to-Tape Alignment Apparatus and Method", filed Jan. 2, 1969, and assigned to Cartridge Television, Inc., the owner of the instant patent application, and now abandoned. This invention relates to improvements in tape transport systems and, more particularly, to a tape transport having a number of spaced, rotatable recording heads movable in scanning relationship past a movable magnetic tape.

In utilizing rotary head movement for playback of prerecorded signals obliquely disposed on a moving magnetic tape, the circular paths of the heads must be canted with respect to the tape to assure proper scanning of the tape record tracks by the heads. The purpose of the oblique arrangement of such record tracks is to utilize, to the maximum extent, the available working area of the tape so as to increase its capacity without complicating the geometry of the transport itself. The heads, mounted in a suitable manner for rotation, such as on the outer periphery of a rotatable drum, move successively past and scan the record tracks of the tape as the latter moves along and adjacent to at least an arcuate portion of the circular paths of travel of the heads. The tape is oriented relative to the head paths by a pair of spaced tape guides which determine the length of the tape portion to be scanned by the heads. The tape guides may be rotatably mounted on suitable stub shafts to minimize friction effects.

A condition which oftentimes occurs with structures of the foregoing type is the mistracking of the heads with respect to the record tracks on the tape. This means that the heads to not properly scan the record track so as to provide the maximum pickup of the signal on the tracks. While the paths of travel of the heads will generally be essentially parallel to the record tracks, the record tracks are not properly scanned because the heads are displaced from the record tracks longitudinally of the tape itself. As a result, the reproduction of the signal is not of a desirable quality and the head paths and the record tracks must be brought into coincidence to achieve the desired result. The problem becomes acute when prerecorded tapes are prepared and sold in cartridges which may be recorded in volume from a master tape. When playing back the tape, the record tracks thereof may or may not be in proper registry with the scanning heads of a rotatable head-tape system. Unless the problem is remedied, the tape cannot be used on the tape transport.

The present invention provides a simple solution for the foregoing problem by providing apparatus and a method for adjusting the position of the head paths relative to the tape and thereby the record tracks thereon so as to bring such paths and tracks into proper registry with each other so as to achieve a desired signal reproduction. The apparatus is especially suitable for use with video tape transport systems of the type where the tape is recorded on one tape transport and played back on another tape transport.

In one embodiment of the invention, a pair of shiftable tape guides are provided by means of which the working span of a movable magnetic tape can be generally shifted axially of the circular paths of travel of the rotating heads of the tape transport. In this way, the paths of the heads, which will essentially be parallel with the record tracks on the tape if there is a mistracking problem, will be caused to move into registry with the tape record tracks so that the heads will properly scan the same. If the teachings of the invention are used with a video tape transport, an observer can see the reproduced signal as a picture on the picture tube of a television receiver and, by adjusting the positions of the tape guides, can determine and obtain the optimum picture quality. This desired picture quality is maintained since the tape guides hold their positions after they have been adjusted.

Another embodiment of the invention utilizes an improved mounting means for the rotating heads wherein such means can be shifted in a direction axially of the circular paths of travel of the heads and relative to the tape guides as the latter remain in fixed positions. Since the tape guides determine the position of the tape portion which is to be scanned by the heads, adjustment of the heads relative to the tape guides will thereby effect an adjustment relative to the tape and its record tracks. This adjustment will achieve the desired result and, for a video tape transport system, the result can be viewed on the picture tube of a television receiver.

The present invention also provides a way in which the angularity of the tape tracks and heads paths can be adjusted to bring them into parallelism or coincidence if necessary. One way of doing this is to shift one of the tape guides relative to the other tape guide to move one end of the working portion of the tape relative to the opposite end thereof. Another way of doing this is to tile the mounting means for the heads so that their circular paths change in inclination relative to the tape. In either case, the angle of the head paths varies relative to the angle of the record paths. Here again, an observer can view the picture tube of a television receiver to determine when the desired angular relationship has been reached.

The primary object of this invention is to provide apparatus for eliminating a mistracking situation which exists between the record tracks on a moving magnetic tape and the circular path of travel of a number of heads of a rotating head tape transport system to thereby assure that the heads will properly scan the record tracks to attain a desired signal reproduction.

Another object of this invention is to provide apparatus of the type described wherein a pair of spaced tape guides are mounted for movement generally axially of the circular paths of travel of the rotating heads so that, when the tape guides are shifted, they will, in turn, move a working portion of the tape generally axially of such paths to thereby bring the heads and record tracks into coincidence with each other.

Another object of this invention is to provide apparatus for eliminating mistracking between record tracks and oblique heads of a tape transport wherein the heads themselves are moved axially of their circular paths of travel and relative to the tape to thereby bring the heads and the record tracks into proper registry with each other.

A further object of this invention is to provide means for bringing the circular paths of the rotating heads of tape transport into parallelism with the record tracks of a moving magnetic tape wherein either the mount for the heads is tilted with respect to the tape or one end of the working portion of the tape is shifted relative to the head paths so as to change the angularity between the heads paths and the record tracks on the tape. Other objects of this invention will become apparent as the following specification progresses, reference being had to the accompanying drawings for an illustration of several embodiments of the invention.

Figure 1:
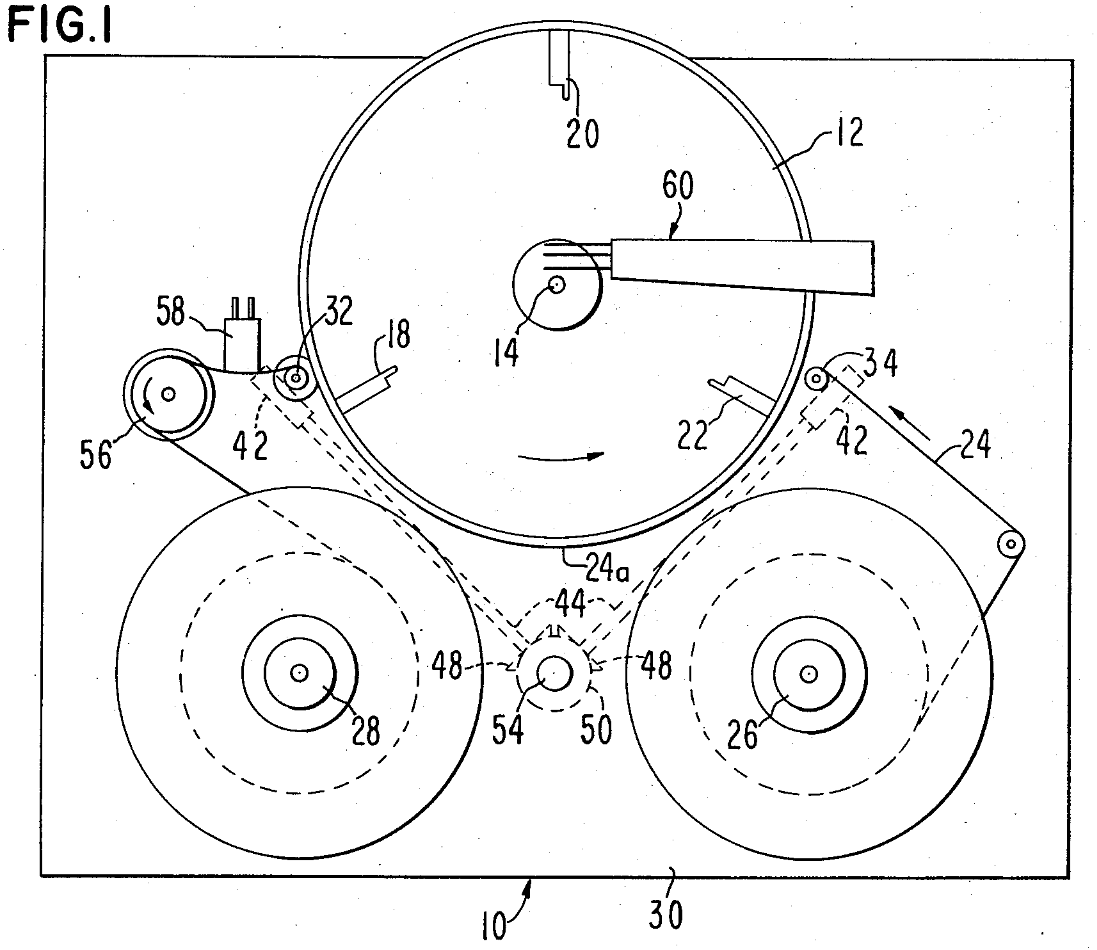
FIG. 1 is a top plan view of a tape transport having one embodiment of this invention incorporated therein.

The first embodiment of this invention is illustrated with respect to a tape transport 10 of the type having a rotatable drum 12 disposed on one side of a support plate 30 and secured to a rotatable drive shaft 14 extending through plate 30 and forming a part of a drive motor 16 disposed on the opposite side of plate 30. Drum 12 has three transducers or heads 18, 20 and 22 mounted at circumferentially spaced locations thereon adjacent to its outer periphery with the heads being in respective generally parallel axially spaced planes. The heads are disposed to scan a central span 24a of a magnetic tape 24 as drum 12 rotates under the influence of motor 16. The tape has oblique record tracks on it and the drum axis is canted relative to the tape so that the heads on the drum will move along paths which are relatively angularly disposed with respect to the tape to thereby assure that the heads will move longitudinally of the record tracks. The tape is connected at its ends to a supply reel 26 and a take-up reel 28. These reels are mounted on respective shafts which are connected to reel drives not shown, whereby the reels can be controllably rotated in opposite directions.

Figures 2, 3:
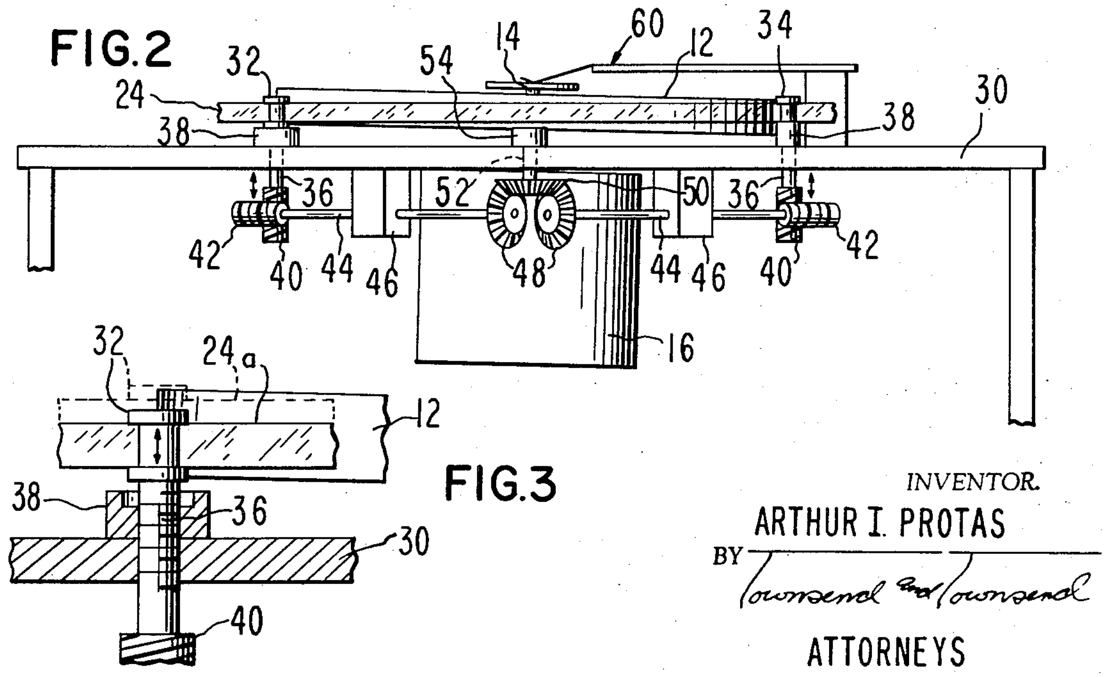
FIG. 2 is a side elevational view of the tape transport of FIG. 1 showing the way in which a pair of spaced tape guides are shiftably mounted thereon.
FIG. 3 is an enlarged, fragmentary, cross-sectional view of one of the tape guides and its mounting structure.

A pair of tape guides 32 and 34 are adjustably and rotatably mounted on plate 30 in the manner shown in FIG. 3. Each tape guide is spool shaped and has a threaded shaft 36 extending axially therefrom and threadedably mounted in a bushing 38 fixedly secured in some suitable manner to plate 30 (FIG. 3). Each shaft 36 has a worm gear 40 on its outer end and a worm 42 is in mesh with worm gear 40. Each worm 42 is carried by a rod 44 secured to a bearing block 46 mounted on the underside of plate 30. Bevel gears 48 are coupled with rods 44 and are in mesh with a bevel gear 50 secured to a shaft 52 extending through plate 30. A knob 54 is connected to shaft 52 to permit rotation of gear 50 and thereby both gears 48. Thus, worms 42 can be rotated in opposite directions to cause both shafts 36 to move together with respect to plate 30. This movement will cause a change of position of tape guides 32 and 34 with respect to the adjacent surface of plate 30 and, since the central span 24a of tape 24 is coupled to these guides, such span is shifted generally axially of the drum 12 in response to the movement of the tape guides.

In operation, tape 24 is mounted on reels 26 and 28 and is engaged by a capstan 56 for driving the tape in a forward direction from the supply reel to the take-up reel. The capstan has a suitable drive (not shown) and the tape moves past an audio head 58 disposed between capstan 56 and guide 32. The tape, as it is moved by the capstan from reel 26 to reel 28, moves past and along a portion of the drum periphery as shown in FIG. 1. The signal pickup heads 18, 20 and 22 on the drum, scan the tape one after another as the drum rotates and as the tape moves. The signals picked up by heads 18, 20 and 22 are coupled to a suitable output through a pickup 60. The tape will have oblique record tracks thereon and the axis of the drum is canted slightly to cause the heads to be inclined substantially to the same angle as the tape tracks. The heads, however, may not move along the tracks properly even though the proper angularity between the tape record tracks and the paths of travel of the heads is achieved. It will then be necessary to adjust the positions of the tape guides and thereby tape span 24a generally axially of the drum to bring the record tracks and the head paths into proper registry.

When the video picture resulting from the pickup of the signals from the tape indicates that the heads are not properly tracking the tape record tracks, knob 54 is manipulated to cause the tape guides to move together in a direction which will provide the desired picture quality. The movement of the tape guides causes axial movement of the tape span 24a to, in turn, cause the record tracks on the tape to be moved into proper registry with the rotating picture and determine what direction to rotate the knob so as to bring in the desired picture.

Figure 4:
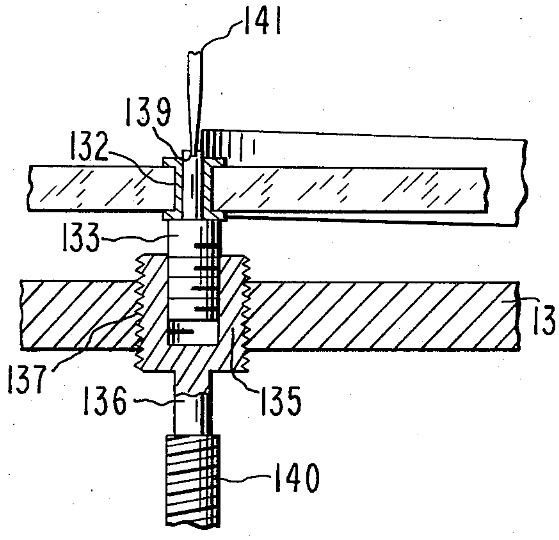
FIG. 4 is a view similar to FIG. 3 but showing a modified form of a means for adjusting a tape guide.

The foregoing apparatus has been described with respect to the tape guides moving together generally axially of the drum periphery. It oftentimes is desirable that one of the tape guides be shifted relative to the support plate independently of the other tape guide. For this purpose, the construction of FIG. 4 can be used wherein a tape guide 132 is provided with a threaded shaft 133 which is telescoped in and threadably mounted on a tubular member 135 which, in turn, is threadably mounted within a hole 137 in base plate 130. Member 135 has a shaft 136 provided with a worm gear 140 attached to it and this worm gear is coupled to a worm in substantially the same manner as shown in FIG. 2. Thus, a pair of members 135 can move together to thereby shift their tape guides together.

Shaft 133 extends through and rotatably receives tape guide 132 and has a tool-receiving recess 139 in its upper end. This recess can receive a screw driver 141 or other tool for rotating shaft 133 relative to member 135 for movement axially of the same. Thus, the construction of FIG. 4 allows tape guide 132 to be moved relative to and independently of another tape guide and this feature permits an adjustment in the angularity of the tape record tracks relative to the circular paths of travel of the heads. This may become necessary if the tape record tracks are out of parallelism with the head paths. If they are, then the reproduced video picture will not have the desired quality. By adjusting shaft 133 with a suitable tool, this parallelism is achieved and further shifting of the tape guides together may then be necessary for the purpose set forth above.

Other suitable means for shifting shaft 133 into and out of member 135 can be provided if desired. Also, other means of making one tape guide movable relative to another tape guide can be used.

Figure 5:
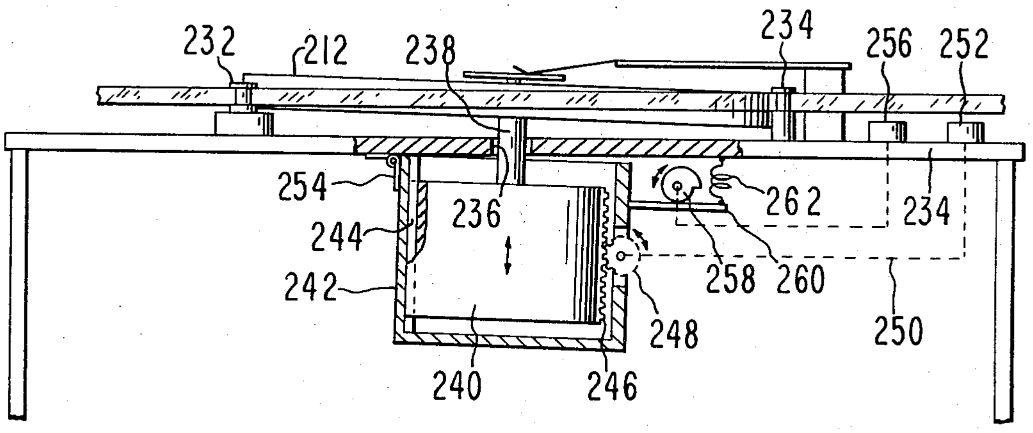
FIG. 5 is a view similar to FIG. 2 but showing a second embodiment of this invention.

Another way of making a pair of tape guides moves relatively to and axially of the circular paths of travel of the heads of a rotating head tape transport is shown in FIG. 5 wherein a pair of spaced tape guides 232 and 234 are coupled at fixed positions to a base plate 230 having an opening 236 for receiving the shaft 238 of a drive motor 240 shiftably mounted in a housing 242 connected to the base plate 230. A drum 212 is coupled to the upper end of shaft 238 for rotation therewith. Motor 240 is movable in opposite directions axially of shaft 238 and suitable guide structure 244 is provided to guide the motor as it is moved.

The means for moving the motor includes a rack 246 secured to the outer surface of the motor and a pinion 248 rotatably connected to housing 242 and in mesh with rack 246. The pinion is coupled by a suitable linkage 250 to a control knob 252 mounted on plate 230. By manipulating control knob 252, pinion 248 is caused to rotate in a direction to advance the rack 26 and thereby move motor 240.

In use, the tape will be coupled to tape guides 232 and 234 and will extend along and adjacent to a portion of the periphery of drum 212. The drum axis will be canted relative to the tape to allow for the angularity of the oblique record tracks thereon. The positions of the tape guides control the location of the central span of the tape relative to the drum periphery.

If it is desired to shift the drum width-wise of the tape to remedy a mis-tracking problem, control knob 252 is rotated by a certain amount which, in turn, causes motor 240 to move in one direction or the other axially of the drum. This movement of the motor will cause the drum to move relative to the tape and thereby move the circular head paths relative to the record tracks of the tape. The user can view the reproduced signal on a video picture tube and can determine when the desired picture quality has been obtained.

The construction of FIG. 5 can be used with an adjustable tape guide if it is deemed necessary or desirable to be able to adjust the angularity of the head paths relative to the tape record tracks. To this end, one of a pair of tape guides can be provided with an adjustable shaft similar to shaft 133, the shaft being threadably mounted in adjacent structure in a manner to permit the tape guide to be moved relative to and axially of the drum and independently of the other tape guide.

Another way of changing this angularity is to hingedly connect housing 242 to support plate 230 as shown in FIG. 5. A hinge 254 is used for this purpose and it is mounted on a peripheral edge portion thereof so that the housing rotates about an axis extending parallel to plate 230 and perpendicular to the drum axis. Any pivotal movement of the housing causes motor 240 and thereby shaft 238 to pivot relative to support plate 230. Thus, the inclination of the shaft can be changed to thereby permit adjustment in the angularity of the circular head paths relative to the tape record tracks.

Any suitable means can be used to controllably shift housing 242. For purposes of illustration, such means includes a control 256 coupled to a cam 258 which engages an extension 260 on the housing and also engages the adjacent surface of support plate 230. Thus, the housing can be made to move toward and away from plate 230. A spring 262 biases extension 260 toward the support plate.

I claim:

1. In a video reproducing and/or recording apparatus of the helical scan type, including a rotary transducer mount having a central drive and a 360° periphery, a system for adjustably helically contouring a magnetic tape wrap to a portion of said periphery not in excess of 180°, comprising:
   - first and second tape guides each having an upper guiding formation and a lower externally threaded mounting portion,
   - first and second bushings each having an upper portion, externally threaded for mounting and internally threaded independently adjustably to receive the lower portion of a respective tape guide, and a lower portion having a pinion formation,
   - a mounting plate positioned transversely of said drive and internally threaded adjustably to receive the external threads of said bushings,
   - first and second worm gears respectively engaging said pinion formations to position said bushings vertically,
   - first and second bevel gears respectively ganged to said worm gears, and
   - common operator means including a third bevel gear for simultaneously positioning the first and second bevel gears so that the vertical portions of the bushings are adjusted in unison.

2. The combination in accordance with claim 1, and means for adjustably tilting said central drive and mount.

3. In a video reproducing and/or recording apparatus of the helical scan type, including a rotary transducer mount having a central drive and a 360° periphery, a system for adjustably helically contouring a magnetic tape wrap to a portion of said periphery not in excess of 180°, comprising:
   - first and second tape guides each comprising upper guide formations and intermediate externally threaded mounting formations and a lower pinion formation,
   - a mounting positioned transversely of said drive and internally threaded adjustably to receive said mounting formations, and
   - means, including a common operator element, for engaging the pinion formations to adjust the tape guides vertically in unison.

* * * * *